United States Patent [19]

Gutleber

[11] Patent Number: 4,529,963

[45] Date of Patent: Jul. 16, 1985

[54] CODE EXPANSION GENERATOR

[76] Inventor: Frank S. Gutleber, 24 Carriage House La., Little Silver, N.J. 07739

[21] Appl. No.: 506,946

[22] Filed: Jun. 22, 1983

[51] Int. Cl.³ ............................................ H03K 13/24
[52] U.S. Cl. ............................. 340/347 DD; 375/25; 307/234
[58] Field of Search .................. 340/347 DD; 375/25, 375/38; 307/234

[56] References Cited

U.S. PATENT DOCUMENTS

| | | |
|---|---|---|
| 3,461,451 | 9/1967 | Gutleber . |
| 4,232,388 | 11/1980 | Isailovic ...................... 340/347 DD |
| 4,293,953 | 10/1981 | Gutleber . |
| 4,307,381 | 12/1981 | Isailovic ...................... 340/347 DD |
| 4,455,662 | 6/1984 | Gutleber ................................. 375/25 |
| 4,471,342 | 9/1984 | Gutleber ...................... 340/347 DD |
| 4,497,068 | 1/1985 | Fischer ........................ 340/347 DD |

Primary Examiner—B. Dobeck

Attorney, Agent, or Firm—Anthony T. Lane; Michael Zelenka; Jeremiah G. Murray

[57] ABSTRACT

Method and apparatus for generating and utilizing a pair of expanded multiplexed noise codes from multi-bit code mate pairs having code bits of equal pulse width by first reducing the pulse width of each of the original code bits of both code mates by one half to form a pair of intermediate code mates having code bits of one half the pulse width of the original code bits. One of the intermediate codes is delayed by a time equal to at least three times the pulse width of the intermediate code bits after which it is added to the other intermediate code mate to form a first partially interleaved code mate, while a second partially interleaved code mate is generated by subtracting the delayed intermediate code mate from the other intermediate code mate and effected, for example, by forming the negative of the delayed intermediate code mate and adding it to the other intermediate code mate. The resulting partially interleaved code mates compress to an impulse when they are detected with their respective matched filters and linearly added.

22 Claims, 3 Drawing Figures

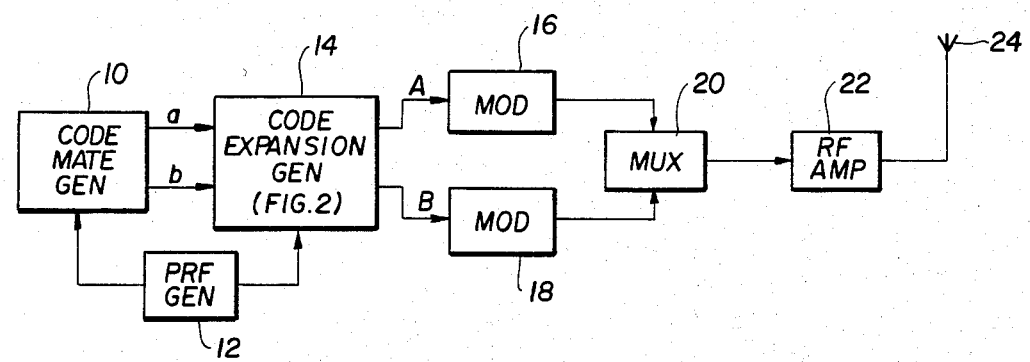
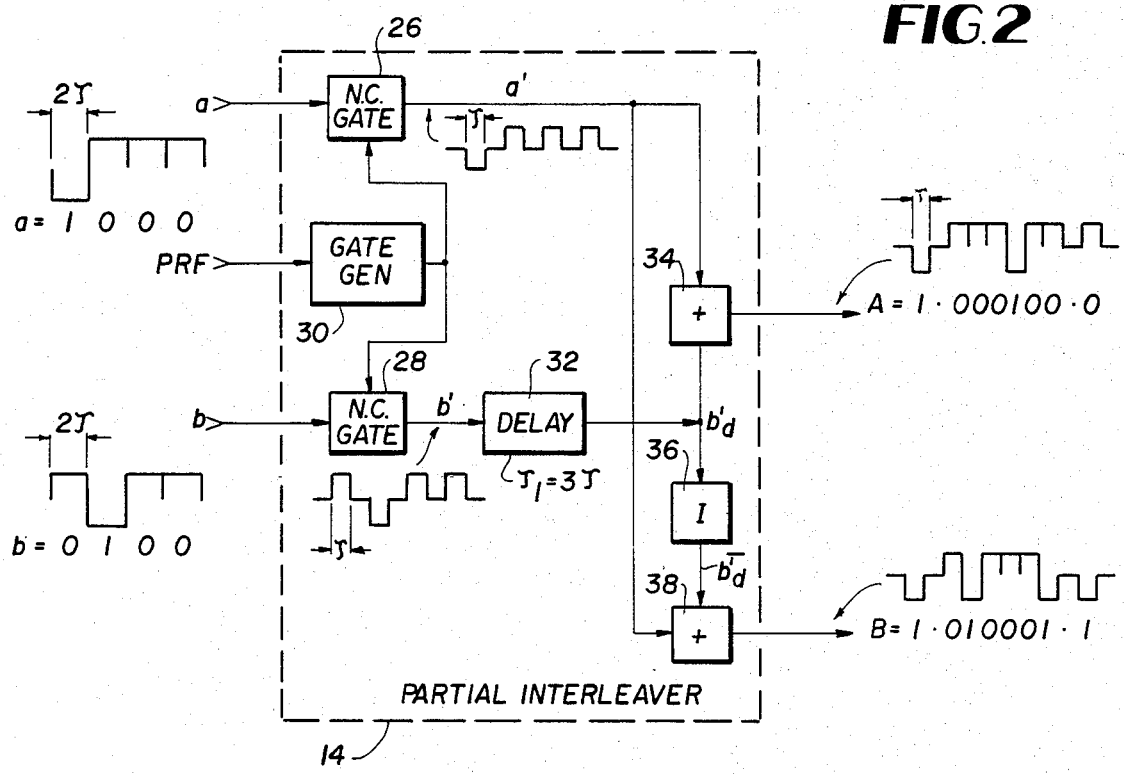
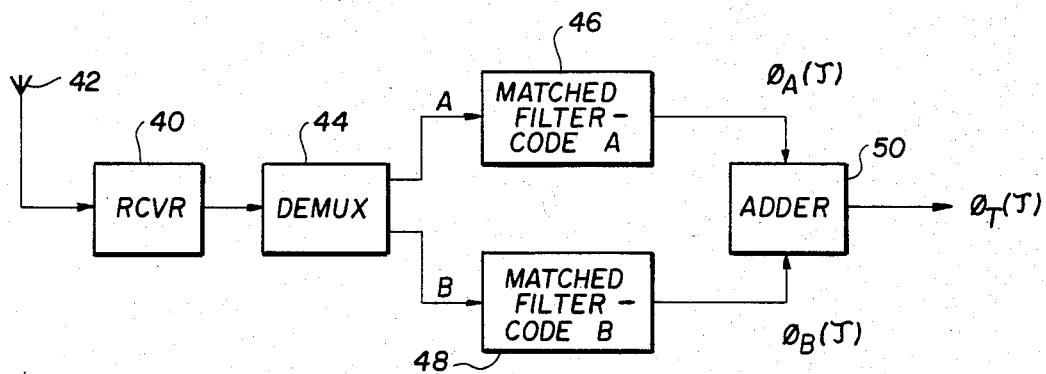

CODE EXPANSION GENERATOR

The invention described herein may be manufactured, used and licensed by or for the Government for governmental purposes without the payment of any royalties thereon or therefor.

CROSS REFERENCE TO RELATED APPLICATIONS

This invention is related to the following co-pending applications filed in the name of the present inventor:

U.S. Ser. No. 499,727, entitled, "Code Generator For Interleaved Multiplexed Noise Codes", filed on May 31, 1983 now abandoned;

U.S. Ser. No. 502,416, entitled, "A Passive Matched Filter For compressing Interleaved Multiplexed Noise Codes", filed on June 8, 1983, now abandoned;

U.S. Ser. No. 497,956, entitled, "Noise Code Generator And Pulse Compression Communications System", filed on May 25, 1983, now U.S. Pat. No. 4,455,662;

U.S. Ser. No. 449,029, entitled, "Multiplexed Noise Code Generator Utilizing Transposed Codes", filed on Dec. 13, 1982, now U.S. Pat. No. 4,514,853; and U.S. Ser. No. 456,157, entitled, "Pulse Compression For Multiplexed Noise Codes", filed on Jan. 6, 1983, now U.S. Pat. No. 4,471,342.

FIELD OF THE INVENTION

This invention relates generally to the generation of multiplexed noise codes having autocorrelation functions which upon detection by a matched filter compress to an impulse and more particularly to the generation of noise codes resulting from expansion of interleaved code mate pairs.

BACKGROUND OF THE INVENTION

Radio communication systems utilizing multiplexed noise codes are generally known. A typical example is shown and described in U.S. Pat. No. 4,293,953, entitled, "Bi-Orthogonal PCM Communications System Employing Multiplexed Noise Codes", which issued to Frank S. Gutleber, the present inventor, on Oct. 6, 1981.

The concept of code expansion for the general class of multiplexed noise codes comprised of code mate pairs having autocorrelation functions which upon detection provide an impulse function is also generally known. One known expansion concept involves the butting of one code mate with the other code mate and is a technique disclosed, for example, in U.S. Pat. No. 3,461,451, entitled, "Code Generator to Produce Permutations of Code Mates", which issued to the present inventor on Aug. 12, 1969. Additionally, the concept of partially overlapping code mate pairs to form expanded code mates is shown and described in the above cross referenced related application, U.S. Ser. No. 497,956, entitled, "Noise Code Generator And Pulse Compression Communications System Therefor", now U.S. Pat. No. 4,455,662 while the concept of generating one type of interleaved code mate pairs is shown and described in the above cross referenced related application, U.S. Ser. No. 499,727, entitled, "Code Generator For Interleaved Multiplexed Noise Codes".

Accordingly, it is an object of the present invention to provide an improvement in the generation and utilization of multiplexed noise codes.

Another object of the invention is to provide an expansion of multiplexed noise code mate pairs by partially interleaving the code bits of code mate pairs Still a further object of the invention is to provide an expansion of multiplexed noise code mate pairs into partially interleaved code mate pairs having autocorrelation functions which upon detection with a matched filter provides an impulse autocorrelation function.

These and other objects are achieved by a method and apparatus for generating and utilizing a pair of expanded multiplexed noise codes from multi-bit code mate pairs having code bits of equal pulse width ($2\tau$) by first reducing the pulse width of each of the original code bits of both code mates by one half to form a pair of intermediate code mates having code bits of pulse width ($\tau$), then delaying one of the intermediate codes by a least three times the pulse width of the intermediate code bits, i.e., $3\tau$ and adding it to the other intermediate code mate to form a first partially interleaved code mate, while a second partially interleaved code mate is generated by subtracting the delayed intermediate code mate from the other intermediate code mate and effected, for example, by forming the negative of the delayed intermediate code mate and adding it to the other intermediate code mate. The resulting partially interleaved code mates compress to an impulse when they are detected with their respective matched filters and linearly added.

BRIEF DESCRIPTION OF THE DRAWINGS

FIG. 1 is a functional block diagram illustrative of transmitter apparatus of a noise modulated communication system utilizing partially interleaved noise code mates generated in accordance with the principles of this invention;

FIG. 2 is a functional block diagram illustrative of the partially interleaved code expansion generator shown in FIG. 1; and FIG. 3 is a functional block diagram of receiver apparatus of the noise modulated communication system for use with the partially interleaved noise codes of this invention.

DESCRIPTION OF THE PREFERRED EMBODIMENT

The present invention is directed to a pulse noise coded modulation communication system employing a type of multi-bit digital codes referred to as code mates, meaning that the information is coded with a composite code that is "noise like" in that it will compress to an impulse when detected with a matched filter. In particular, one class of noise codes are known wherein pairs of coded signals termed "code mates" have autocorrelation functions which provide a peak output at a given time and a zero output or outputs having the same magnitude but opposite polarity, at all other times. When code mate signals, for example, are orthogonally multiplexed, matched filter detected and linearly added, there is provided a lobeless impulse output of a high amplitude at one given time ($\tau = 0$) and zero output at all other times ($\tau \neq 0$). For a pair of code mates a and b, this may be stated mathematically as, $$\phi_a(\tau) = -\phi_b(\tau) \qquad (1)$$

for all $\tau \neq 0$, where $\phi_a(\tau)$ is the autocorrelation function of code a, $\phi_b(\tau)$ is the autocorrelation function of b, and where $\tau = 0$ is the location of the main lobe. This can be illustrated by the following example. For code mate pairs a and b, where a=1 0 0 0 and b=0 0 1 0, the autocorrelation function $\phi_a(\tau)$ of code a can be obtained in a well known fashion by detection in a matched filter comprised of, for example, a combination of time delay circuits, phase control circuits, and a linear adder, a typical example being shown and described in applicant's prior U.S. Pat. No. 4,293,953, referenced above. Such a matched filter detector develops a digital autocorrelation function sequence $\phi_a(\tau)$ which can be illustrated in the following manner as:

$$
\begin{array}{r}
1\ 0\ 0\ 0 \\
1\ 0\ 0\ 0 \\
1\ 0\ 0\ 0 \\
0\ 1\ 1\ 1 \\
\hline
\phi_a(\tau) = 1\ .\ 0\ 0^4\ 0\ .\ 1 \\
\uparrow \\
\tau = 0
\end{array} \tag{2}
$$

where, and as shown in FIG. 2, 0 denotes a pulse of unit amplitude and positive polarity, 1 denotes a pulse of unit amplitude and negative polarity, the dot (.) denotes zero amplitude, and wherein the exponent signifies the amplitude of the respective pulses. Accordingly, in the expression of equation (2), the main lobe ($\tau=0$) comprises a positive pulse having an amplitude of 4.

In the same manner, the autocorrelation function $\phi_b(\tau)$ of code b can be developed in a corresponding matched filter in the following fashion:

$$
\begin{array}{r}
0\ 0\ 1\ 0 \\
1\ 1\ 0\ 1 \\
0\ 0\ 1\ 0 \\
0\ 0\ 1\ 0 \\
\hline
\phi_b(\tau) = 0\ .\ 1\ 0^4\ 1\ .\ 0 \\
\uparrow \\
\tau = 0
\end{array} \tag{3}
$$

From equations (2) and (3) it can be seen that $\phi_a(\tau) = -\phi_b(\tau)$ for all $\tau \neq 0$, and furthermore compress to a lobeless impulse at $\tau = 0$ when linearly added together. This is shown below as:

$$
\begin{array}{r}
\phi_a(\tau) = 1\ .\ 0\ 0^4\ 0\ .\ 1 \\
\phi_b(\tau) = 0\ .\ 1\ 0^4\ 1\ .\ 0 \\
\hline
\phi_T(\tau) = \ldots 0^8 \ldots
\end{array} \tag{4}
$$

Now in accordance with the subject invention, code pairs of n bits meeting the requirements of equation (1) can be expanded into an interleaved code structure whose composite autocorrelation function is an impulse, that is, one peak embedded in all zeros. Accordingly, for a basic code mate pair a and b, expanded partially interleaved code mates A and B can be generated by reducing the pulse width ($2\tau$) of the n code bits of codes a and b by one half to form a pair of 2m bit intermediate codes a' and b' of pulse width $\tau$. Following this, one of the intermediate codes, for example code b', is delayed by at least three halves pulse widths ($3\tau$) and not more than the intermediate code length ($2n\tau$) and then adding it to the other intermediate code a' to generate the code A. The code mate B is generated by subtracting the delayed code b' from code a' which is preferably accomplished by forming the negative of the delayed intermediate code b' and adding it to the undelayed intermediate code a'.

This can be expressed mathematically as:

$$A = a'(t), b'(t + \tau_o) \tag{5}$$

$$B = a'(t), \overline{b'(t + \tau_o)} \tag{6}$$

where the comma (,) signifies the code b' is delayed and added to code a', ($t+\tau_o$) signifies that the delay is equal to $\tau_o$, where $\tau_o = 3\tau < \tau < 2n\tau$, and $2n$ is equal to the number of code bits in the codes a' and b'.

Furthermore, this can be demonstrated by considering the generation of partially interleaved code mates A and B where $\tau_o = 3\tau$:

$$
\begin{array}{ll}
a = 1\ 0\ 0\ 0 & (7) \\
b = 0\ 1\ 0\ 0 & (8) \\
a' = 1.0.0.0. & (9) \\
b' = 0.1.0.0. & (10)
\end{array}
$$

$$
\begin{array}{r}
a' = 1.0.0.0. \\
b'_d = \phantom{1.}0.1.0.0. \quad (\text{delay} = 3\tau) \\
\hline
a' + b'_d = A = 1.000100.0.
\end{array} \tag{11}
$$

$$
\begin{array}{r}
a' = 1.0.0.0. \\
\overline{b'_d} = \phantom{1.}1.0.1.1. \quad (\text{delay} = 3\tau) \\
\hline
a' + \overline{b'_d} = B = 1.010001.1.
\end{array} \tag{12}
$$

The autocorrelation functions of the expanded code mate pairs A and B are developed as follows. For code A, the autocorrelation function $\phi_A(\tau)$ is:

$$
\begin{array}{r}
1.000\ 100.0\ . \\
1.0\ 00100\ .0. \\
1.\ 00010\ 0.0. \\
0\ .1110\ 11.1. \\
1.000\ 100.0\ . \\
1.00\ 0100.\ 0. \\
1.0\ 00100\ .0. \\
0\ .1110\ 11.1. \\
\hline
\phi_A(\tau) = 1\ldots 0^3.0.00^80.0.0^3\ldots 1. \\
\uparrow \\
\tau = 0
\end{array} \tag{13}
$$

In the same fashion, the autocorrelation function $\phi_B(\tau)$ of code B is developed as:

$$
\begin{array}{r}
0.101\ 110.0\ . \\
0.1\ 01110\ .0. \\
1.\ 01000\ 1.1. \\
1\ .0100\ 01.1. \\
1.010\ 001.1\ . \\
0.10\ 1110.\ 0. \\
1.0\ 10001\ .1. \\
0\ .1011\ 10.0. \\
\hline
\phi_B(\tau) = 0\ldots 1^3.1.10^81.1.1^3\ldots 0. \\
\uparrow \\
\tau = 0
\end{array} \tag{14}
$$

From expressions (13) and (14), it can be seen that $\phi_A(\tau) = -\phi_B(\tau)$ for all $\tau \neq 0$ and furthermore compress to a lobeless impulse at $\tau = 0$ when linearly added together. This is shown below as:

$$
\begin{array}{r}
\phi_A(\tau) = 1\ldots 0^3.0.00^8\ 0.0.0^3\ldots 1 \\
\phi_B(\tau) = 0\ldots 1^3.1.10^8\ 1.1.1^3\ldots 0 \\
\hline
\phi_T(\tau) = \ldots\ldots\ldots 0^{16}\ldots\ldots\ldots \\
\uparrow \\
\tau = 0
\end{array} \tag{15}
$$

Thus when the original code mates a and b meet the requirements of equation (1) the partially interleaved codes A and B also exhibit the same characteristic in that $\phi_A(\tau)+\phi_B(\tau)$ contain a single peak and no lobes. Additionally, this partial interleaving process may be continued a predetermined number of times to obtain a mate pair noise code structure of any length desired.

In order to illustrate that a blank or signal absence in a code can be treated as a code bit and interleaved as such, consider the code mate pair a and b where a=1 0 0 and b=1 . 1. Partially interleaving these codes with a delay=$3\tau$, as before generates expanded code mate pairs A and B as follows:

$$a = 100 \quad (16)$$
$$b = 1.1 \quad (17)$$
$$a' = 1.0.0. \quad (18)$$
$$b' = 1...1. \quad (19)$$

$$\begin{array}{r} a' = 1.0.0. \\ b'_d = \phantom{1.0.}1...1. \quad \text{(delay} = 3\tau) \\ \hline a' + b'_d = A = 1.010..1. \end{array} \quad (20)$$

$$\begin{array}{r} a' = 1.0.0. \\ b'_d = \phantom{1.0.}0...0. \quad \text{(delay} = 3\tau) \\ \hline a' + \overline{b'_d} = B = 1.000..0. \end{array} \quad (21)$$

The autocorrelation functions of the codes A and B generated according to expressions (20) and (21) are furthermore developed as follows: For code A the autocorrelation function $\phi_A(\tau)$ is:

$$\begin{array}{r} 0.101..\,0\,. \\ 1.01\,0\,.\,.1. \\ 0.1\,0\,1\,..0. \\ 1.\,0\,1\,0..1. \\ 0\,\,.\,101..0. \\ \hline \phi_A(\tau) = 0.1...1^20^51^2...1.0. \\ \uparrow \\ \tau = 0 \end{array} \quad (22)$$

And the autocorrelation function of code B is:

$$\begin{array}{r} 1.000..\,0\,. \\ 1.00\,0\,.\,.0. \\ 1.0\,0\,0\,...0. \\ 1.\,0\,0\,0..0. \\ 0\,\,.\,111...1. \\ \hline \phi_B(\tau) = 1.0...0^20^50^2...0.1. \\ \uparrow \\ \tau = 0 \end{array} \quad (23)$$

As before, from the expressions (22) and (23) it can be seen that $\phi_A(\tau) = -\phi_B(\tau)$ for all $\tau \neq 0$ and compress to a lobeless impulse at $\tau = 0$. Furthermore, this is shown below as:

$$\begin{array}{r} \phi_A(\tau) = 0.1...1^20^5\,1^2...1.0. \\ \phi_B(\tau) = 1.0...0^20^5\,0^2...0.1. \\ \hline \phi_T(\tau) = \,......\,0^{10}.\,....... \\ \uparrow \\ \tau = 0 \end{array} \quad (24)$$

While there has been shown the method by which expanded partially interleaved code mates are obtained in accordance with the subject invention, apparatus for generating and utilizing these codes in a noise code modulated communication system is disclosed in FIGS. 1 and 2.

Referring first to FIG. 1, reference numeral 10 denotes a multi-bit digital signal generator for generating the basic code mates a and b. These codes are generated under the control of a pulse repetition frequency (PRF) generator 12 coupled to the code mate generator 10, whereupon the codes a and b are outputted therefrom in a time related multi-bit binary digital sequence which are applied to a code expansion generator 14, the details of which are shown in FIG. 2. The code expansion generator 14 is operable to produce a pair of partially interleaved code mates A and B which are applied to respective modulator circuits 16 and 18. The modulators 16 and 18 typically are comprised of phase modulators, the output of which comprise separate bi-phase modulated codes which are fed to an orthogonal multiplexer 20 which may employ either time, frequency or quadraphase multiplexing. The multiplexed output codes of the multiplexer 20 are fed to an RF output amplifier 22 which is coupled to a transmitting antenna 24, which radiates an RF carrier containing the orthogonally multiplexed codes A and B.

Referring now to FIG. 2, the code expansion generator 14 comprises means for partially interleaving the code mates a and b where each bit of the four bit codes has a pulse width, for purpose of illustration, of $2\tau$. The code mates a and b are shown coupled to a pair of normally closed signal gates 26 and 28 which are controlled by a gate generator 30. The gate generator is synchronized to and triggered by the pulse repetition frequency generator 12 of FIG. 1 and is operable to render the gates 26 and 28 on for only the first half of each code bit applied thereto and accordingly provides outputs of intermediate code mates a' and b', respectively, having bits whose pulse width is reduced to and equal to $\tau$ while retaining their original polarity sequence. Thus where code mate a=1000, intermediate code mate a' is also a code comprised of 1000. In the same fashion, intermediate code b'=0100.

The intermediate code b' is coupled to a time delay device, such as a delay line 32 which is adapted to provide a delay at least equal to three times the pulse width of the code bits of the intermediate codes a' and b' or $3\tau$ and no greater than the code length of the intermediate code lengths a' and b', i.e., $2n\tau$. In the embodiment shown in FIG. 2, the delay $\tau_1$ provided by the delay line 32 comprises a delay of $3\tau$. The delayed intermediate code b' comprises a code b'$_d$, whereupon it is applied concurrently to a first linear adder 34 and a code inverter 36. The adder 34 additionally has the intermediate code mate a' applied thereto and is operable to linearly add the codes a' and b'$_d$ to generate a first partially interleaved code mate A in accordance with expression (11). The code inverter 36 is operable to reverse the polarity of the code bits of the delayed code mate b'$_d$ and therefore provides an output of the negative of the delayed code, i.e., $\overline{b'_d}$. The negative of the delayed intermediate code $\overline{b'_d}$ is applied to a second linear adder 38 concurrently with the intermediate code mate a', whereupon the adder 38 operates to generate the partially interleaved code mate B in accordance with expression (12).

Thus where the original code mates a and b are comprised of four code bits each, the partial interleaver code expansion generator 14 generates expanded partially interleaved codes A and B of 10 bits each. When desirable, the delay provided by the delay line 32 can be varied within the limits $3\tau < \tau_1 < 2n\tau$ to vary the length of the code mates A and B and furthermore a plurality of interleavers 14 can be cascaded to obtain a mate pair noise code structure of any desired length.

Referring now to FIG. 3, there is disclosed receiver apparatus which is responsive to the code modulated RF signal radiated from the antenna 24 and containing the partially interleaved expanded codes A and B. Accordingly, radio receiver apparatus 40 is shown coupled to a receiving antenna 42 and is operable to receive the RF signal containing the multiplexed codes A and B whereupon they are fed as an IF signal to a demultiplexer 44 which is operable to provide two outputs of demultiplexed codes A and B. The demultiplexed codes A and B are next applied to their respective matched filters 46 and 48. The matched filters are typical of the types shown and described in the aforementioned U.S. Pat. No. 4,293,953. The matched filters are operable to compress the codes A and B to provide respective autocorrelation function outputs $\phi_A(\tau)$ and $\phi_B(\tau)$ according to equations (13) and (14). The autocorrelation function outputs of the matched filters 46 and 48 are then applied to a linear adder 50, which is operable to provide a lobeless output signal $\phi_T(\tau)$ in accordance with equation (15).

Thus what has been shown and described in a noise modulated pulse compression communication system utilizing a large time bandwidth digital noise structure generated by a partial interleaving process. When desirable, the code mates may be interchanged, and either code may be negated or inverted while still preserving the lobeless impulse capability when compressed in a match filter.

Having thus shown and described what is at present considered to be the preferred method and means for implementing the subject invention, it is to be noted that the same has been made by way of illustration and not limitation. Accordingly, all modifications, alterations and substitutions may be made without departing from the spirit and scope of the invention as set forth in the appended claims.

I claim:

1. A method of generating a second pair of multi-bit digital codes from a first pair of multi-bit digital codes comprising the steps of:
   generating first and second multi-bit digital codes having code bits of predetermined equal pulse widths;
   reducing the pulse width of each of said first and second codes by a predetermined fraction of said equal pulse widths and generating thereby first and second intermediate digital codes of reduced pulse width;
   delaying said second intermediate code by a predetermined time interval which is a function of the reduced pulse width of the bits of said first and second intermediate codes;
   combining said first intermediate code and said delayed second intermediate code in a first manner to form a first interleaved code; and
   combining said first intermediate code and said second intermediate code in a second manner to form a second interleaved code.

2. The method of claim 1 wherein said step of delaying said second code comprises the step of delaying said second intermediate code by a time interval which is at least equal to three times the reduced pulse width of the bits of said first and second intermediate codes, and forming thereby first and second partially interleaved codes.

3. The method of claim 1 wherein said step of delaying said second intermediate code comprises the step of delaying said second intermediate code by a time interval which is selectively variable between three times the pulse width of the bits of said first and second intermediate codes and the code length of said first and second intermediate codes.

4. The method of claim 3 wherein said step of reducing the pulse width of each bit of said first and second codes comprises a step of reducing said equal pulse width by at least one half the pulse width of the code bits of said first and second codes.

5. The method of claim 4 wherein said step of combining in the first manner comprises the step of adding said intermediate codes.

6. The method of claim 5 and wherein said step of combining in a second manner comprises the step of subtracting said intermediate codes.

7. The method of claim 5 wherein said step of combining in a second manner comprises the steps of generating the negative of said delayed second intermediate code and then adding said first intermediate code and said negative of said delayed second intermediate code.

8. The method of claim 4 wherein said first and second codes comprise a pair of equal length binary noise code mates which upon detection with a matched filter produces an impulse autocorrelation function.

9. The method of claim 4 and additionally including the steps of:
   multiplexing said first and second interleaved codes;
   modulating said multiplexed codes on an RF carrier and radiating said carrier;
   receiving and demodulating said carrier to provide a multi-bit code received signal;
   demultiplexing said received signal to provide respective coded signals of said first and second interleaved codes;
   autocorrelation function detecting said first and second interleaved coded signals to provide first and second compressed output signals; and
   combining said first and second compressed output signals to provide a substantially lobeless impulse output signal.

10. The method of claim 9 wherein said step of autocorrelation function detecting comprises the steps of detecting with a matched filter.

11. The method of claim 9 wherein said step of combining said first and second compressed output signal comprises the step of linearly adding said compressed output signals.

12. Apparatus for generating a second pair of multi-bit digital codes from a first pair of multi-bit digital codes, comprising:
   means for generating first and second multi-bit digital codes having code bits of predetermined equal pulse widths;
   means for reducing the pulse width of each of said first and second codes by a predetermined fraction of said equal pulse widths and generating thereby first and second intermediate digital codes of reduced pulse width;
   means for delaying said second intermediate code by a predetermined time interval which is a function of the reduced pulse width of the bits of said first and second intermediate codes;
   means for combining said first intermediate code and said delaying second intermediate code in a first manner to form a first interleaved code; and means for combining said first intermediate code and said second intermediate code in a second manner to form a second interleaved code.

13. The apparatus of claim 12 wherein said means of delaying said second code comprises means for delaying said second intermediate code by a time interval which is at least equal to three times the reduced pulse width of the bits of said first and second intermediate codes, and forming thereby first and second partially interleaved codes.

14. The apparatus of claim 12 wherein said means for delaying said second intermediate code comprises means for delaying said second intermediate code by a time interval which is selectively variable between three times the pulse width of the bits of said first and second intermediate codes and the code length of said first and second intermediate codes.

15. The apparatus of claim 14 wherein said step of reducing the pulse width of each bit of said first and second codes comprises a step of reducing said equal pulse width by at least one half the pulse width of the code bits of said first and second codes.

16. The apparatus of claim 15 wherein said means for combining in a first manner comprises means for adding said intermediate codes.

17. The apparatus of claim 16 and wherein said means for combining in a second manner comprises means for subtracting said intermediate codes.

18. The apparatus of claim 16 wherein said means for combining in a second manner comprises means for generating the negative of said delayed second intermediate code and means for adding said first intermediate code and said negative of said delayed second intermediate code.

19. The apparatus of claim 15 wherein said first and second codes comprise a pair of equal length binary noise code mates which upon detection with a matched filter produces an impulse autocorrelation function.

20. The apparatus of claim 15 and further comprising:
means for multiplexing said first and second interleaved codes;
means for modulating said multiplexed codes on an RF carrier and radiating said carrier;
means for receiving and demodulating said carrier to provide a multi-bit coded received signal;
means for demultiplexing said received signal to provide respective coded signals of said first and second interleaved codes;
means for autocorrelation function detecting said first and second interleaved coded signals to provide first and second compressed output signals; and
means for combining said first and second compressed output signals to provide a substantially lobeless impulse output signal.

21. The apparatus of claim 20 wherein said means for autocorrelation function detecting comprises means for detecting with a matched filter.

22. The apparatus of claim 20 wherein said means for combining said first and second compressed output signals comprises means for linearly adding said compressed output signals.

* * * * *